(12) United States Patent
Arai et al.

(10) Patent No.: US 6,670,954 B2
(45) Date of Patent: Dec. 30, 2003

(54) THREE-DIMENSIONAL SKELETON DATA ERROR ABSORBING APPARATUS

(75) Inventors: Masatoshi Arai, Kanagawa (JP); Ryosuke Miyata, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 249 days.

(21) Appl. No.: 09/848,348

(22) Filed: May 4, 2001

(65) Prior Publication Data

US 2001/0028351 A1 Oct. 11, 2001

Related U.S. Application Data

(63) Continuation of application No. PCT/JP98/06019, filed on Dec. 28, 1998.

(51) Int. Cl.[7] ............................................. G06T 17/00
(52) U.S. Cl. ...................... 345/420; 345/473; 345/474; 700/245
(58) Field of Search ................................ 345/473, 474, 345/420, 644; 700/245

(56) References Cited

U.S. PATENT DOCUMENTS 6,088,042 A * 7/2000 Handelman et al. ........ 345/473

FOREIGN PATENT DOCUMENTS

JP          10-340354        12/1998

* cited by examiner

*Primary Examiner*—Mark Zimmerman
*Assistant Examiner*—Lance W. Sealey
(74) *Attorney, Agent, or Firm*—Staas & Halsey LLP

(57) ABSTRACT

A three-dimensional skeleton data error absorbing apparatus is provided, which is capable of rendering an object at a correct rendering position by absorbing an error based on skeleton data calculation. A fixed skeleton portion specifying part 20 specifies a fixed skeleton portion whose rendering position is desired to be fixed, and a skeleton matrix calculating part 40 obtains a coordinate of a fixed position. A skeleton length detecting part 31, a skeleton hierarchy level detecting part 32, and an error absorption priority detecting part 33 of an error absorbing skeleton specifying part 30 select an error absorbing skeleton that absorbs an error. An error absorption calculating part 60 obtains, by inverse matrix calculation, a determinant, which should be satisfied by a skeleton matrix of error absorbing skeleton, based on the matrix calculation results and the coordinate of a fixed position of the other skeletons. An error based on the difference in a platform is simulated in a resource environment of an assumed platform, and error absorption processing is conducted so as to absorb the error results.

17 Claims, 10 Drawing Sheets

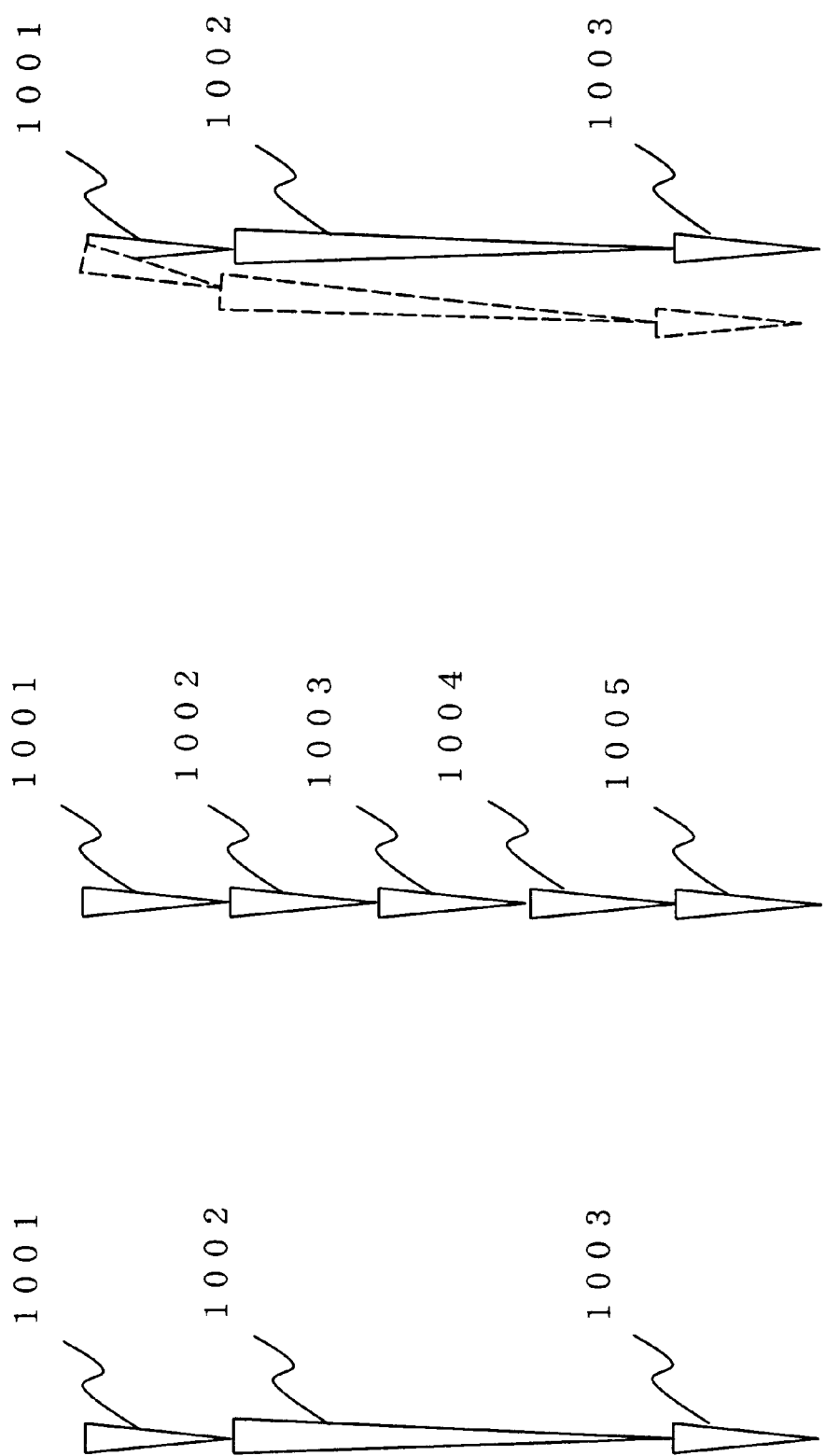

THREE-DIMENSIONAL SKELETON DATA ERROR ABSORBING APPARATUS

This application is a continuing application, filed under 35 U.S.C. §111(a), of International Application PCT/JP98/06019, filed Dec. 28, 1998.

TECHNICAL FIELD

The present invention relates to an apparatus for subjecting a character to three-dimensional computer graphics processing by relating skeleton that describes a framework to polygon data that describes an outer surface, and in particular, to a three-dimensional skeleton data error absorbing apparatus for absorbing an error based on calculation of skeleton data.

BACKGROUND ART

Due to the recent enhanced performance of computer systems and development of a multimedia processing technique, an environment allowing even a personal computer or the like to process sophisticated three-dimensional computer graphics (hereinafter, abbreviated as a "CG") is being established, and a graphic accelerator board and the like dedicated to processing of a three-dimensional CG are being provided.

There are various types of data formats of a three-dimensional CG. In a game involving the movement of a character such as an artificial creature and an object, generally, data on an object is held mainly in a polygon format, and regarding a rendering process, a texture is attached to a generated polygon mesh, whereby high-speed rendering processing is conducted.

The polygon is obtained by relating positional information of polygon vertexes to texture information that is a graphic pattern, and forms an outer surface of a three-dimensional character such as an artificial creature. The polygon is data for forming a mesh-shaped wire-frame model by disposing polygon vertexes on the outer surface of a three-dimensional object model designed by an animator so that changes in an outside shape are understood, and connecting each polygon vertex, and is related to texture information describing the pattern of an outer surface.

As described above, in the case where data is held in a polygon format, as the number of polygons that can be assigned to an object is larger, CG processing of higher quality will be achieved. In a recent entertainment application, there is a demand for a high quality rendering. It is not rare that more than 2,000 polygons are assigned to a three-dimensional character in order to satisfy user's needs. It is a demanding task to describe the movement/deformation on a polygon vertex basis, so as to provide a three-dimensional object described by a large number of polygons with movement/deformation information in accordance with each scene. Therefore, an idea of skeleton is introduced. If the movement of a three-dimensional character such as an artificial creature is expressed by skeleton that is to be a framework thereof, and polygon data that is to be an outer surface is related to the skeleton, it becomes easy to conduct polygon deformation processing. This is because, in general, an artificial creature also has joints conceptually, and its skeleton is mostly operated with respect to the joints. The movement of an artificial creature on a scene basis is described as changes in skeleton. Since each skeleton is related to polygon vertexes forming the outside shape, the movement of each polygon vertex can be described and calculated based on the movement of the skeleton.

Skeleton describing the movement of a three-dimensional character has the following features.

Firstly, there is a parenthood relationship in linking between skeletons. For example, in the case of an arm of an artificial creature, parenthood relationships are defined in the order from a shoulder that is a parent, a brachium, a forearm, and a hand. When the brachium is moved, the forearm and the hand are moved in accordance with the movement of the brachium, and the hand is moved in accordance with the movement of the forearm. More specifically, when the movement of a parent object is described, the movement is automatically reflected onto the description of the movement of a child object.

Secondly, matrix calculation is used for processing the movement of skeleton. A complicated multi-dimensional vector calculation is required for describing the movement in a three-dimensional virtual space, which is processed by matrix calculation. The parenthood relationship described as the above-mentioned first feature is also subjected to calculation by matrix multiplication. In the case where skeleton has a plurality of linked parenthood relationships as in the above example of the arm, matrix multiplications are conducted a plurality of times corresponding to the number of parenthood relationships.

Thirdly, the length of a skeleton has a value specific to each skeleton. More specifically, there are long skeletons and short skeletons. In terms of principle, there may be a skeleton as a fulcrum for rotation, having no length. In the case where a long skeleton 1002 is rotated as shown in FIG. 10(*a*), even when an angle is slightly changed, the movement of its end portion may be expressed in a large amount. In contrast, in the case where the movement amount at the end portion of a skeleton because of an error is the same between a long skeleton and a short skeleton, a movement angle becomes smaller in the long skeleton, so that a visual deformation degree is decreased therein.

Fourthly, due to the features of a three-dimensional object and setting of a model by an animator, there is a so-called "depth of a hierarchy" in skeleton linking. The depth of a hierarchy expresses the number of skeletons to be linked for forming a unified object. In an object having a deep skeleton hierarchy as shown in FIG. 10(*b*), the number of skeletons for forming the object is generally large. For example, in a tail of an artificial dinosaur that moves flexibly, a nose of an elephant, and the like, models having a relatively large number of linked skeletons are adopted. Therefore, such models are considered to have a deep skeleton hierarchy.

Fifthly, a skeleton is related to a polygon vertex forming an outer surface, and has a numerical value such as a weight representing a degree of an influence of the movement of each skeleton on the movement of each polygon vertex. For example, in the case where a weight of a polygon vertex with respect to a skeleton is "100", the polygon vertex moves 100% in accordance with the movement of the skeleton. In the case where a weight is "0", even when the skeleton is changed, the polygon vertex will neither be influenced nor changed.

As described in the above-mentioned prior art, by using skeleton data, the movement of a three-dimensional character is described on a skeleton basis, and an apparatus user such as an animator can easily describe an animation scene.

However, according to graphics processing of a three-dimensional character using skeleton, the following error occurs based on skeleton calculation. When a rendering is actually conducted as shown in FIG. 10(*c*), although a dotted line represents the position of skeletons to be displayed, the skeletons are in some cases displayed, being shifted to a position represented by a solid line. In this manner, the position of a rendered object is shifted, and the object unnaturally wobbles and does not move smoothly.

The first problem of a skeleton calculation error is that an error occurring at a time of calculation of a parent skeleton is transferred to child skeleton calculation and accumulated/amplified. In particular, in the case where a hierarchy of skeleton forming an object is deep, an error with respect to a child skeleton at an end is increased in a transfer/accumulation amount. Skeleton calculation is a product of matrix calculation, so that an error is increased due to multiplication.

The second problem of a skeleton calculation error is based on the difference in a computer resource to be a platform. More specifically, when an animator creates a three-dimensional character, the three-dimensional character is created with a high detail and precision. Therefore, a workstation with a high processing ability and the like are generally used, and calculation is conducted by the double-precision operation "DOUBLEWORD". On the other hand, for actually rendering the three-dimensional character in a game by a user, an inexpensive platform with a processing ability which is not so high as that in the workstation is mostly used, and calculation is in most cases conducted in the floating-point operation of single-precision "FLOAT". In this case, even if matrix multiplication with high precision is conducted, numerical values may be rounded off, and the rounded-off error is accumulated/amplified on a matrix calculation basis.

The third problem of a skeleton calculation error is based on the length of a skeleton. A skeleton has a length, and the rotation of the skeleton is obtained by a radian angle and a movement amount of an end portion. Even in the case where an error occurring in calculation is a small value representing a small shift that cannot be visually recognized on a screen, when the error movement amount of an end portion is the same between a short skeleton and a long skeleton, the rotation angle becomes larger in the short skeleton than in the long skeleton, and an error at an end becomes larger in the long skeleton than in the short skeleton.

The fourth problem of a skeleton calculation error is as follows: when it is desired to prevent a positional shift and shaking caused by an error with respect to an object having particularly high eye-catching property, among object portions of a three-dimensional character, the occurrence and degree of a skeleton calculation error are determined by other factors, irrespective of the degree of an eye-catching property of skeleton; therefore, an error may become conspicuous to a user.

DISCLOSURE OF INVENTION

The three-dimensional skeleton calculation error absorbing apparatus of the present invention overcomes the above-mentioned problems, and its object is to absorb and cancel an error occurring in skeleton calculation. A first object is to absorb and cancel an error transferred/accumulated due to the depth of skeleton by matrix multiplication between a parent skeleton and a child skeleton so that an error will not be excessively accumulated with respect to the movement of the child skeleton. A second object is to absorb and cancel an error transferred/accumulated due to the length of skeleton at an end portion of the skeleton. A third object is to absorb and cancel a rounded-off error which is caused by the difference in calculation precision between the platform at a time of development and creation of a three-dimensional character and the platform in end use by a user. Fourthly, an error of a particular skeleton such as a skeleton of an object portion with a high eye-catching property is preferentially absorbed and cancelled. The object of the three-dimensional skeleton calculation error absorbing apparatus of the present invention is to absorb and cancel an error occurring in skeleton calculation processing, thereby preventing an unnatural positional shift and shaking in a display image of a three-dimensional character so as to obtain a natural and smooth display.

In order to achieve the above-mentioned object, the three-dimensional skeleton calculation error absorbing apparatus of the present invention includes: an input part for inputting skeleton data; a fixed skeleton portion specifying part for specifying a skeleton portion whose display position is desired to be fixed; an error absorbing skeleton specifying part for determining an error absorbing skeleton that absorbs an error based on skeleton calculation among a skeleton group having a linked relationship up to the fixed skeleton portion; a skeleton matrix calculating part for conducting matrix calculation in accordance with a linked relationship of the skeleton; a fixed position storing part for storing a fixed position that is to be a matrix calculation result of the fixed skeleton portion; and an error absorption calculating part for obtaining a skeleton matrix of the error absorbing skeleton in such a manner that, in skeleton matrix calculation for calculating the fixed position in a subsequent frame, a matrix calculation result of the fixed skeleton portion matches the fixed position.

Because of the above-mentioned configuration, a skeleton portion to be fixed, its fixed position, and an error absorbing skeleton that absorbs an error can be specified, and a determinant of the error absorbing skeleton can be adjusted so that a skeleton matrix calculation result of the fixed skeleton portion becomes a coordinate of the fixed position. The fixed skeleton portion is displayed at the coordinate of the fixed position, and a rendered image does not wobble or shift between frames.

Next, it is preferable that, assuming that M1 represents a matrix calculation result obtained by calculating the fixed position, in skeleton matrix calculation for calculating the fixed position in a subsequent frame, $M2_{parent}$ represents a matrix calculation result of a skeleton at a level higher than that of the error absorbing skeleton among skeletons other than the error absorbing skeleton, $M2_{child}$ represents a matrix calculation result of a skeleton at a level lower than that of the error absorbing skeleton, and M3 represents a skeleton matrix of the error absorbing skeleton, the error absorption calculating part obtains the error absorbing skeleton matrix by using an equation $M3=M2_{parent}^{-1} \times M1 \times M2_{child}^{-1}$.

Because of the above-mentioned configuration, deformation and adjustment of a determinant of an error absorbing skeleton can be correctly obtained by inverse matrix calculation, and a fixed skeleton portion can be displayed at a coordinate of a fixed position.

Next, it is preferable that the error absorbing skeleton specifying part includes a skeleton length detecting part, and selects a longest skeleton among the skeleton group having a linked relationship as the error absorbing skeleton.

Because of the above-mentioned configuration, a skeleton with the longest skeleton length whose movement for absorbing an error is expected to be inconspicuous can be selected as an error absorbing skeleton.

Next, it is preferable that the error absorbing skeleton specifying part includes a skeleton hierarchy level detecting part, and selects a skeleton at a highest hierarchy level among the skeleton group having a linked relationship as the error absorbing skeleton.

Because of the above-mentioned configuration, a skeleton at the highest hierarchy that is expected to be most effective for absorbing an error at an initial stage so that the error will not be accumulated/increased between skeleton links can be selected as an error absorbing skeleton.

Next, it is preferable that the skeleton data includes a priority at which a skeleton is selected as a target for the error absorbing skeleton, and the error absorbing skeleton specifying part selects the error absorbing skeleton from the skeleton group having a linked relationship in accordance with the priority.

Because of the above-mentioned configuration, in selecting an error absorbing skeleton, a priority at which a skeleton is selected as an error absorbing skeleton can be previously set, which allows a user to conduct minute setting.

Next, it is preferable that the priority shows a degree of an eye-catching property as an object portion of a skeleton.

Because of the above-mentioned configuration, in selecting an error absorbing skeleton, a skeleton with a high degree of an eye-catching property whose movement for absorbing an error is considered to be conspicuous is avoided, and a skeleton with a low degree of an eye-catching property can be preferentially selected as an error absorbing skeleton.

Next, it is preferable that the error absorbing skeleton specifying part includes a skeleton masking part for specifying a skeleton that is not to be selected as the error absorbing skeleton, and the skeleton specified by the skeleton masking part is not selected as the error absorbing skeleton.

Because of the above-mentioned configuration, a particular skeleton can be prevented from being selected as an error absorbing skeleton, which allows a user to conduct minute setting.

Next, it is preferable that the skeleton data contains allowable angle data for absorbing a skeleton error, the error absorption calculating part includes an error absorption ratio calculating part for calculating an error absorption capacity from a product of an allowable angle and a length of each skeleton and calculating an error absorption ratio from the error absorption capacity of each skeleton, with respect to a total error absorption capacity of all the skeletons having a linked relationship, and an error absorption amount assigning part for assigning an absorption amount of an error with respect to the fixed position in a subsequent frame to each skeleton in accordance with the error absorption ratio, and executes inverse matrix calculation for absorbing the assigned error amount on a skeleton basis.

Because of the above-mentioned configuration, a plurality of skeletons can absorb an error in a distributed manner, and an error can be appropriately absorbed by a linked skeleton group in a distributed manner, with an error amount absorbed in a distributed manner being in accordance with the size of an allowable angle set in each skeleton.

Next, it is preferable that the error absorption ratio calculating part is capable of adjusting weighting with respect to an error absorption ratio on a skeleton basis.

Because of the above-mentioned configuration, weighting by a user can be conducted in addition to automatic assignment of an error amount based on an error absorption capacity, which enables more minute setting to be conducted.

Next, it is preferable that the fixed skeleton portion specifying part is capable of specifying a plurality of fixed skeleton portions among the skeleton group having a linked relationship, and the error absorbing skeleton specifying part selects a plurality of error absorbing skeletons.

Because of the above-mentioned configuration, a plurality of portions can be specified as fixed skeleton portions, and their errors can be absorbed by a plurality of skeletons in a distributed manner.

Next, it is preferable that, in an editing operation for absorbing an error based on skeleton calculation, matrix calculation of the fixed position calculation is executed based on calculation precision in a calculating part of a platform used in skeleton data creating/editing, thereby specifying a fixed position, and error absorption calculation by the error absorption calculating part is executed based on calculation precision in a calculating part of a platform of an apparatus for rendering a three-dimensional object, thereby absorbing a calculation rounded-off error based on calculation precision of the platform.

Because of the above-mentioned configuration, an interplatform error can be absorbed, during development and production of animation, processing with high precision can be conducted using a platform with satisfactory calculation precision, and a fixed skeleton portion can be rendered at a correct fixed position even during use in an environment of a different platform such as game equipment of a user.

Next, the computer-readable recording medium storing processing operations for absorbing an error based on skeleton calculation in editing of skeleton data and polygon data describing a three-dimensional character of the present invention stores a program including: an input processing operation of inputting skeleton data; a fixed skeleton portion specifying processing operation of specifying a skeleton portion whose display position is desired to be fixed; an error absorbing skeleton specifying processing operation of determining an error absorbing skeleton that absorbs an error based on skeleton calculation among a skeleton group having a linked relationship up to the fixed skeleton portion; a skeleton matrix calculating processing operation of conducting matrix calculation in accordance with a linked relationship of the skeleton; a fixed position storing processing operation of storing a fixed position that is to be a matrix calculation result of the fixed skeleton portion; and an error absorption calculating processing step of adjusting a skeleton matrix of the error absorbing skeleton in such a manner that, in skeleton matrix calculation for calculating a position of the fixed skeleton portion in a frame to be subjected to error absorption, a matrix calculation result matches the fixed position.

Next, it is preferable that the skeleton data contains allowable angle data for absorbing a skeleton error, the error absorption calculating processing operation includes: an error absorption ratio calculating processing operation of calculating an error absorption capacity from a product of an allowable angle and a length of each skeleton and calculating an error absorption ratio from the error absorption capacity of each skeleton, with respect to a total error absorption capacity of all the skeletons having a linked relationship; an error absorption amount assigning processing operation of assigning an absorption amount of an error with respect to the fixed position in a subsequent frame to each skeleton in accordance with the error absorption ratio; and a processing operation of executing inverse matrix calculation for absorbing the assigned error amount on a skeleton basis.

It is preferable that, in an editing operation for absorbing an error based on skeleton calculation, the skeleton matrix calculating processing operation includes a processing operation of executing matrix calculation of the fixed position calculation based on calculation precision in a calculating part of a platform used in skeleton data creating/editing, thereby specifying a fixed position, and the error absorption calculating processing operation includes a processing operation of executing error absorption calculation based on calculation precision in a calculating part of a platform of an apparatus for rendering a three-dimensional object, thereby absorbing a calculation rounded-off error based on calculation precision of the platform.

Because of the above-mentioned configuration, by loading the processing program onto a computer, an error based on skeleton calculation can be absorbed by using a personal computer or the like, and a three-dimensional object can be rendered with smooth and natural movement

BRIEF DESCRIPTION OF DRAWINGS

FIG. 10 illustrates error generation of skeleton data in the prior art.

BEST MODE FOR CARRYING OUT THE INVENTION

Hereinafter, the present invention will be described by way of embodiments.

Embodiment 1

An outline of an entire configuration of a three-dimensional skeleton data error absorbing apparatus of Embodiment 1 and an entire processing flow in the apparatus will be described with reference to the drawings. The three-dimensional skeleton data error absorbing apparatus of Embodiment 1 specifies a skeleton portion whose display position is desired to be fixed, selects an error absorbing skeleton that absorbs an error based on skeleton calculation, from a group of linked skeletons including the skeleton portion, and subjects skeleton data of the error absorbing skeleton to error absorption processing.

Figure 1C:
FIG. 1 illustrates an error based on skeleton calculation and a concept of error absorption according to the present invention.
Figure 1B:
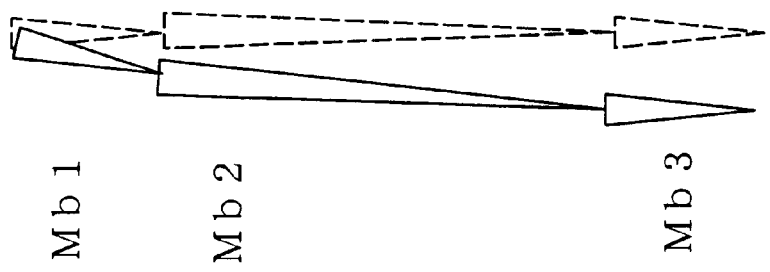
Figure 1A:
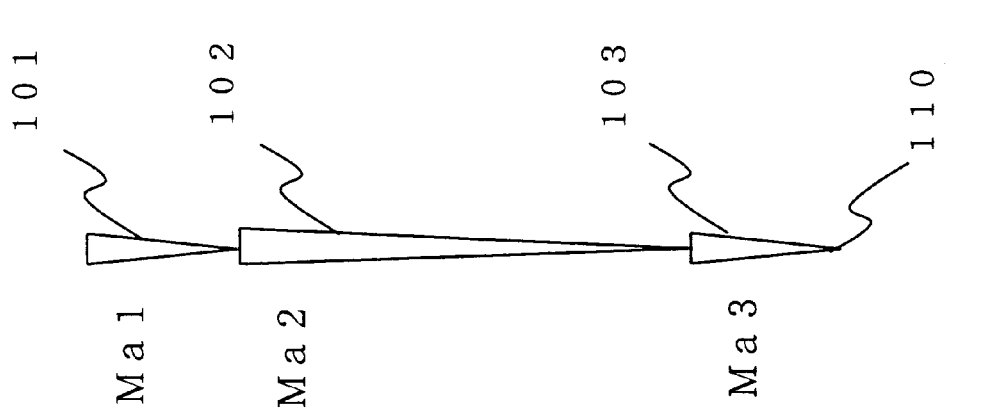
Figure 2:
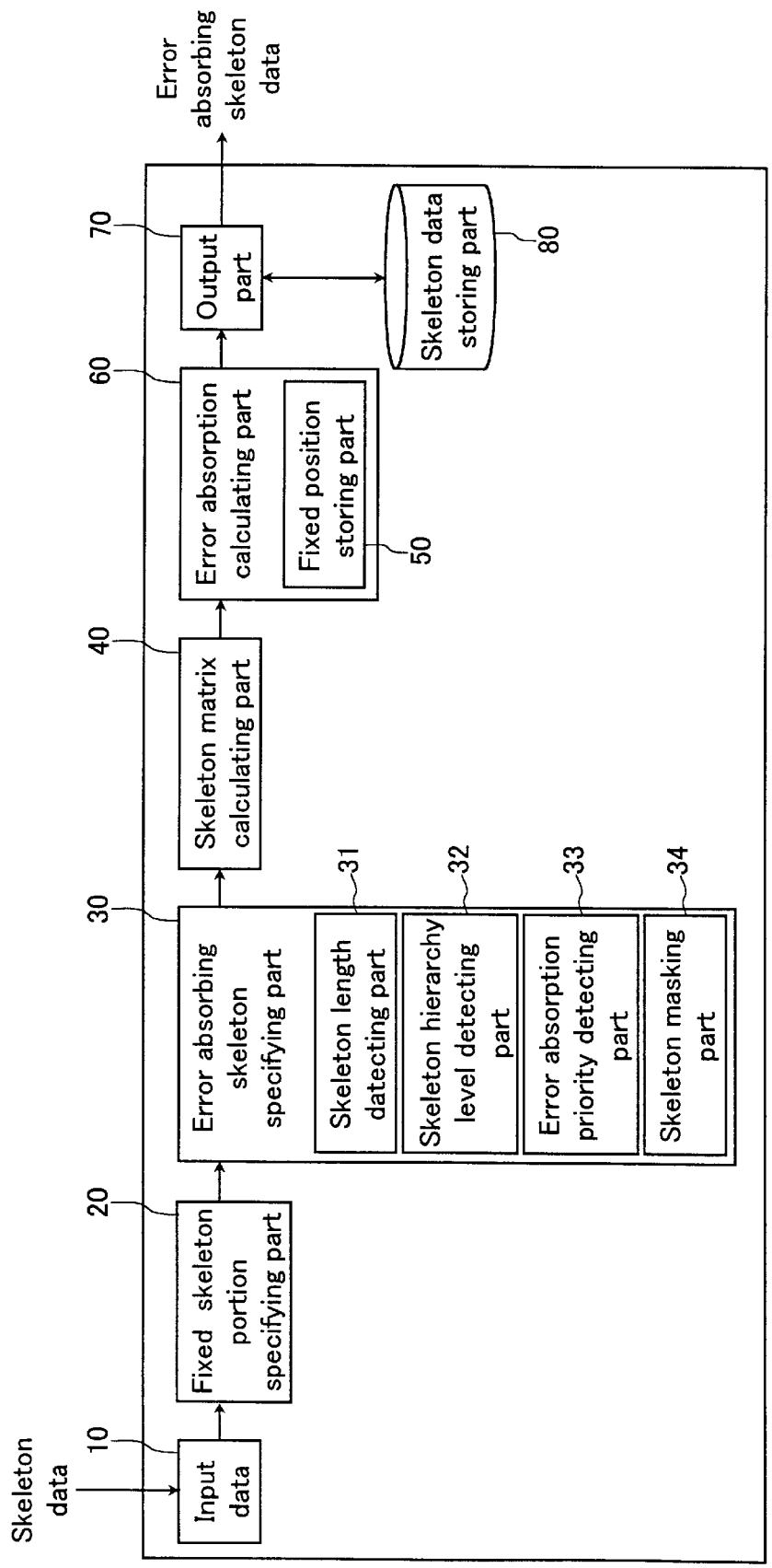
FIG. 2 is a schematic block diagram of a three-dimensional skeleton data error absorbing apparatus of Embodiment 1 according to the present invention.
Figure 3:
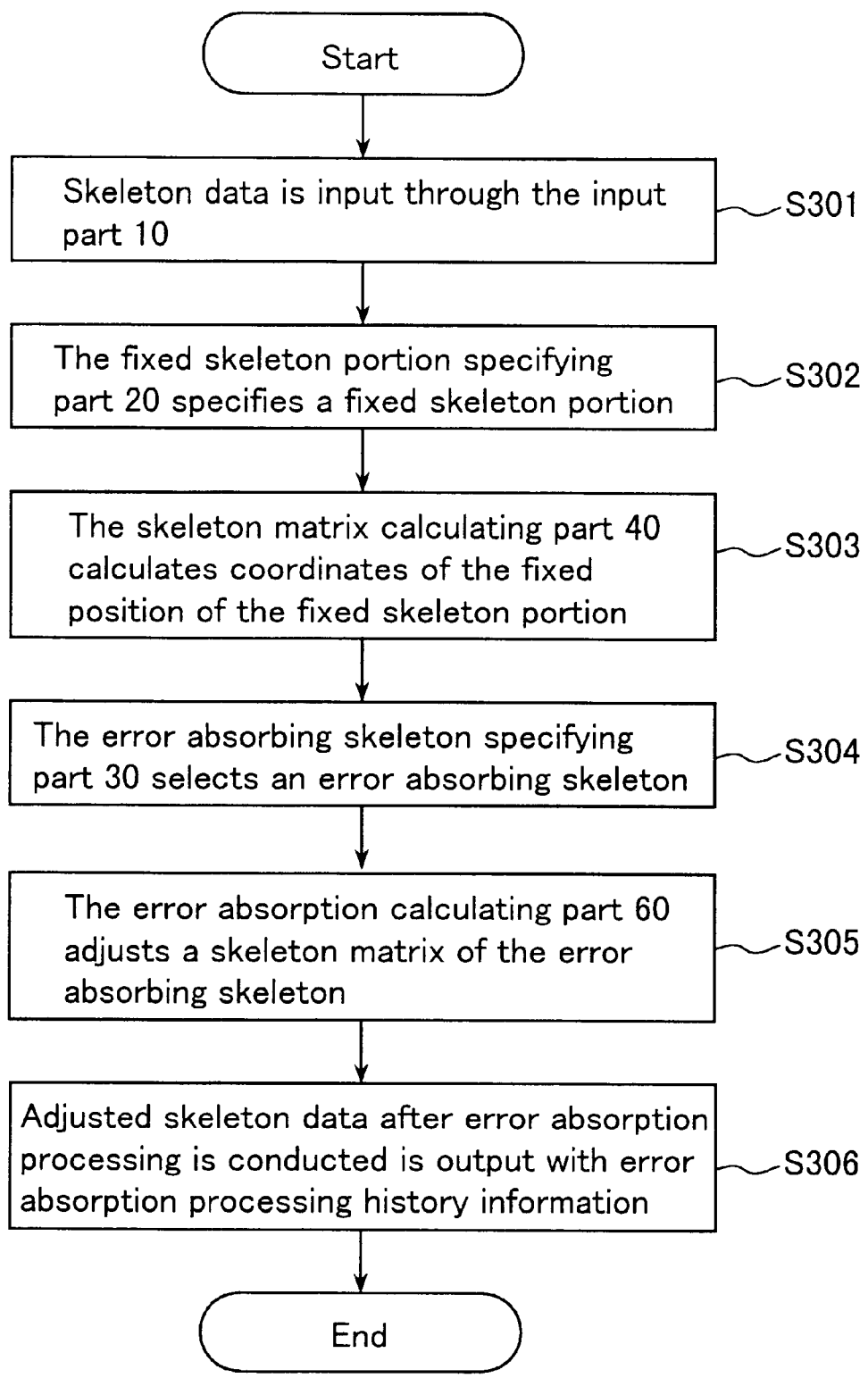
FIG. 3 is a flow chart showing an entire processing flow of the three-dimensional skeleton data error absorbing apparatus of Embodiment 1 according to the present invention.

FIG. 1 illustrates an error based on skeleton calculation and a concept of error absorption. FIG. 2 is a schematic block diagram of the apparatus. FIG. 3 shows an entire processing flow of the apparatus as processing steps.

First, an error based on skeleton calculation and a concept of error absorption will be described with reference to FIG. 1.

It is assumed that skeletons 101 to 103 belong to a skeleton group having a linked parenthood relationship, the skeleton 101 is a parent skeleton in a higher-level hierarchy, the skeleton 102 is a skeleton in a middle hierarchy, and the skeleton 103 is a child skeleton in a lower-level hierarchy. Two kinds of errors will be described here. The first one is an inter-frame error, and the second one is an inter-platform error. The inter-platform error will be described later in Embodiment 3.

The inter-frame error refers to that, in skeleton matrix calculation between a frame (FIG. 1($a$)) and a subsequent frame (FIG. 1($b$)) at a certain time, a fixed skeleton portion 110 whose position is to be fixed is shifted due to an error based on matrix calculation, as shown in FIGS. 1($a$) and 1($b$). Such an error is caused by various factors such as an effective number of digits of a determinant defined in each skeleton, an order, calculation precision of a platform to be used, and a frame difference; however, an error itself occurs as calculation results of a skeleton determinant.

As an exemplary adjustment method, a method will be described for previously fixing a numerical value for calculation assuming that the results of skeleton matrix calculation become the same between frames, and determining a matrix of the error absorbing skeleton by inverse matrix calculation. It is assumed that a skeleton matrix of the skeleton 101 is Ma1, a skeleton matrix of the skeleton 102 is Ma2, and a skeleton matrix of the skeleton 103 is Ma3 in FIG. 1($a$). A coordinate M1 of the skeleton portion 110 that is desired to be fixed is calculated by the following determinant (Equation 1).

$$M1=Ma1*Ma2*Ma3 \quad \text{(Equation 1)}$$

where * represents multiplication of a matrix.

In this description, it is preferable that M1 is fixed between predetermined frames.

In the case where an error is not absorbed in the subsequent frame, as shown in FIG. 1($b$), a coordinate M2 of the fixed skeleton portion 110 is calculated by the following determinant (Equation 2), assuming that the skeleton matrix of the skeleton 101 is Mb1, the skelet on matrix of the skeleton 102 is Mb2, and the skeleton matrix of the skeleton 103 is Mb3.

$$M2=Mb1*Mb2*Mb3 \quad \text{(Equation 2)}$$

Herein, in order that the coordinate of the fixed skeleton portion 110 is not varied between the frames, M2=M1 should be satisfied. However, due to an error, M2=M1 is not satisfied as shown in FIG. 1($b$). Herein, the skeleton 102 is selected as the error absorbing skeleton, and is allowed to absorb an error as shown in FIG. 1($c$).

More specifically, assuming that a left side M2 of (Equation 2) is forcefully prescribed to be M1, and Mb2' represents the skeleton matrix of the skeleton 102 that is the error absorbing skeleton, then (Equation 3) is obtained.

$$M1=Mb1*Mb2'*Mb3 \quad \text{(Equation 3)}$$

where Mb2' is represented by (Equation 4).

$$Mb2' = Mb1^{-1} \times M1 \times Mb3^{-1}$$ (Equation 4)

where $Mb1^{-1}$ is an inverse matrix of a skeleton matrix at a higher level than the error absorbing skeleton 102, and $Mb3^{-1}$ is an inverse matrix of a skeleton matrix at a lower level than the error absorbing skeleton 102.

As described above, a skeleton matrix of a skeleton that absorbs an error can be adjusted by using inverse matrix calculation, whereby coordinates of the fixed skeleton portion can be matched between the frames.

Next, FIG. 2 shows a configuration of the three-dimensional skeleton calculation error absorbing apparatus of the present invention that realizes the principle of the above-mentioned error absorption. As shown in FIG. 2, the three-dimensional skeleton data error absorbing apparatus of Embodiment 1 mainly includes an input part 10, a fixed skeleton portion specifying part 20, an error absorbing skeleton specifying part 30, a skeleton matrix calculating part 40, a fixed position storing part 50, an error absorption calculating part 60, an output part 70, and a skeleton data storing part 80. The fixed position storing part 50 is not shown as being formed in a register on a memory. It is assumed that a memory, a device, and the like required for control processing of the entire system are provided.

The input part 10 is used for inputting skeleton data, and also provides an interface between the user and the apparatus.

The fixed skeleton portion specifying part 20 specifies a skeleton portion whose display position is desired to be fixed on a display screen. For example, in a scene where the position of a certain portion of an artificial creature should be fixed, (e.g., in the case where the artificial creature grabs a fixed substance with its hand), a corresponding skeleton portion is specified so as to fix the portion. The corresponding skeleton portion may be specified by the user through the input part 10, or specifying information may be previously included in skeleton data. Herein, it is assumed that the end portion 110 of the skeleton 103 shown in FIG. 1(a) is specified as a fixed skeleton portion.

The error absorbing skeleton specifying part 30 determines an error absorbing skeleton that absorbs an error based on skeleton calculation among a skeleton group having a linked relationship up to the fixed skeleton portion. The error absorbing skeleton specifying part 30 includes a skeleton length detecting part 31, a skeleton hierarchy level detecting part 32, an error absorption priority detecting part 33, and a skeleton masking part 34.

The skeleton length detecting part 31 detects a length of a skeleton from input skeleton data, and the error absorbing skeleton specifying part 30 can select the longest skeleton among the skeleton group having a linked relationship as an error absorbing skeleton.

The skeleton hierarchy level detecting part 32 detects a hierarchy level representing a parenthood relationship in the skeleton group having a linked relationship. In an example shown in FIG. 1, the skeleton 101 is detected as a parent skeleton in a higher-level hierarchy (e.g., hierarchy level 1), the skeleton 102 is detected as a skeleton in a middle hierarchy (e.g., hierarchy level 2), and the skeleton 103 is detected as a child skeleton at a lower-level hierarchy (e.g., hierarchy level 3). The error absorbing skeleton specifying part 30 can select a skeleton in the highest level hierarchy among the skeleton group having a linked relationship as an error absorbing skeleton.

The error absorption priority detecting part 33 detects a priority at which a skeleton is selected as a target error absorbing skeleton included in the skeleton data. This priority may be set by a creator during modeling of skeleton data, or an editor may dynamically set the priority at a time of editing error absorption. It is preferable that the priority is set in inversely proportional to the degree of an eye-catching property as an object portion of a skeleton. This is because it is required to give consideration so as not to select a portion with a higher eye-catching property as a target for adjustment/deformation for error absorption. The error absorbing skeleton specifying part 30 can select an error absorbing skeleton in accordance with a priority.

The skeleton masking part 34 specifies a skeleton that is not to be selected as an error absorbing skeleton. More specifically, the skeleton masking part 34 specifies a skeleton that is not to be targeted for adjustment/deformation for error absorption, so as to previously protect it. The error absorbing skeleton specifying part 30 does not select a masked skeleton as an error absorbing skeleton.

It is preferable that it is possible to specify a subsystem to be activated among the subsystems 31 to 34 of the error absorbing skeleton specifying part 30. Furthermore, it is also preferable that it is possible to weight output results of the activated subsystems 31 to 34.

The skeleton matrix calculating part 40 conducts matrix calculation in accordance with a linked relationship of skeletons, in a portion for conducting skeleton matrix calculation.

The fixed position storing part 50 extracts a coordinate of the fixed skeleton portion specified by the fixed skeleton portion specifying part 20 from matrix calculation results by the skeleton matrix calculating part 40, and stores it as a fixed position. The stored fixed position data is referred to in the error absorption calculating processing in the error absorption calculating part 60. In the example for describing a concept of error absorption used in FIG. 1, the fixed position to be stored is M1.

The error absorption calculating part 60 adjusts a skeleton matrix of the error absorbing skeleton specified by the error absorbing skeleton specifying part 30 in skeleton calculation of the subsequent frame. The adjustment of the skeleton matrix uses the inverse matrix calculation (Equation 4) conducted in the description of a concept of error absorption with reference to FIG. 1.

The output part 70 outputs skeleton data and error absorption processing history information after the skeleton error absorption processing is conducted. The error absorption processing history information is a history showing what kind of error absorption processing is conducted. If required, history information is output, such as a fixed skeleton portion, an error absorbing skeleton, and a matrix before error absorption, a matrix after error absorption, and an error absorption amount.

The skeleton data storing part 80 is a storage apparatus for storing, in the apparatus, skeleton data and error absorption history information after the skeleton error absorption processing is conducted.

Next, an outline of a processing flow of the three-dimensional skeleton calculation error absorbing apparatus of the present invention with the above-mentioned configuration will be described with reference to a flow chart in FIG. 3.

First, skeleton data is input through the input part 10 (Operation 301). Herein, it is assumed that skeleton data as shown in FIG. 1(a) is input.

Next, the fixed skeleton portion specifying part 20 specifies a fixed skeleton portion whose display position is desired to be fixed (Operation 302). A fixed skeleton portion may be specified by previously including specifying information in the input skeleton data and extracting it by the fixed skeleton portion specifying part 20. Alternatively, it may be possible that an editor of skeleton error absorption processing actually renders input data for a try, watches the rendering results on a display thereof, and specifies a portion required to be fixed by the fixed skeleton portion specifying part 20.

Next, the skeleton matrix calculating part 40 calculates a coordinate of a fixed position of the fixed skeleton portion (Operation 303). In the above-mentioned exemplary description of a concept of error absorption used in FIG. 1, matrix multiplication is conducted in accordance with (Equation 1) to obtain M1. The coordinate of the calculated fixed position is stored in the fixed position storing part 50.

Next, the error absorbing skeleton specifying part 30 selects an error absorbing skeleton (Operation 304). An error absorbing skeleton may be specified by previously including specifying information in the input skeleton data and extracting it by the error absorbing skeleton specifying part 30. Alternatively, it may be possible that an editor of the skeleton error absorption processing actually renders input data for a try, watches the rendering results on a display thereof, and specifies an error absorbing skeleton. Furthermore, conditions for selecting an error absorbing skeleton can be narrowed down by the skeleton length detecting part 31, the skeleton hierarchy level detecting part 32, the error absorption priority detecting part 33, and the skeleton masking part 34. If the output results of the activated subsystems 31 to 34 of the error absorbing skeleton specifying part are weighted, an error absorbing skeleton is selected considering the weighting.

Next, the error absorption calculating part 60 adjusts a skeleton matrix of an error absorbing skeleton (Operation 305). In the above-mentioned exemplary description of a concept of error absorption using FIG. 1, M2$b'$ is obtained by using (Equation 4). An error absorbing skeleton is not necessarily limited to the skeleton 102.

Next, adjusted skeleton data after the error absorption processing is conducted is output with the error absorption processing history information, and stored in the skeleton data storing part 80 (Operation 306).

As described above, in the three-dimensional skeleton data error absorbing apparatus of Embodiment 1, due to the skeleton calculation error absorption processing in accordance with the above-mentioned Operations 301 to 306, an error occurring in skeleton matrix calculation is absorbed by adjusting a determinant of an error absorbing skeleton to fix an object portion to be fixed at a fixed position, whereby natural movement of a three-dimensional character can be ensured.

Embodiment 2

A three-dimensional skeleton data error absorbing apparatus of Embodiment 2 according to the present invention will be described with reference to the drawings. In the three-dimensional skeleton data error absorbing apparatus of Embodiment 2, skeleton data of each skeleton contains allowable angle data for absorbing a skeleton error, an error absorption capacity is calculated from a product of an allowable angle and a length of each skeleton, and an error absorption ratio of the error absorption capacity of each skeleton is calculated with respect to the total error absorption capacity of all the skeletons having a linked relationship. Regarding an inter-frame error with respect to a fixed position, an error amount to be absorbed is assigned to each skeleton, in accordance with the error absorption ratio of each skeleton.

Figure 4:
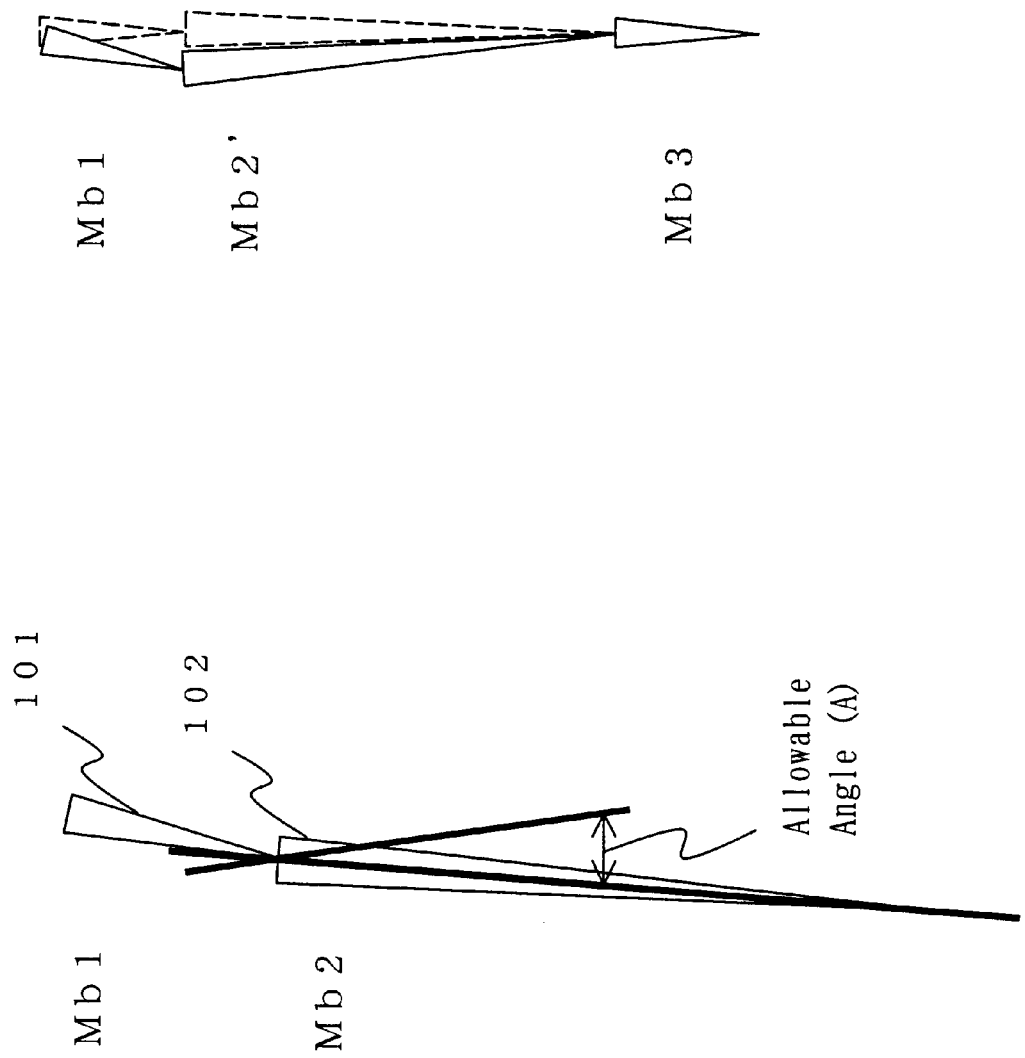
FIG. 4 shows a concept of an error absorption capacity of skeleton.

A concept of the error absorption capacity of skeleton will be described with reference to FIG. 4.

The error absorption capacity of skeleton refers to a rotation movement amount allowable for absorbing an error of each skeleton. The allowable movement amount is assumed to be set at a time of modeling the three-dimensional object or at a time of editing the error absorption, based on the length of each skeleton, the eye-catching property of each skeleton on a display screen, the relationship between adjacent skeletons, and the like. More specifically, an allowable angle (A) is set in a rotation direction of a skeleton at an end portion on an upper side (close to a parent skeleton) of a skeleton hierarchy level of each skeleton (FIG. 4(*a*)). Each skeleton of a skeleton group up to a fixed position is adjusted for rotation movement in an allowable angle range during absorption of an error, whereby the position of the fixed skeleton portion is matched with the fixed position (FIG. 4(*b*)).

Herein, it is required to assign an absorption amount of an interframe error with respect to a fixed position to each skeleton in accordance with an error absorption ratio of each skeleton. In Embodiment 2, this assignment is conducted in proportion with an error absorption capacity of each skeleton. Assuming that a skeleton error absorption capacity C is a rotation movement amount allowable for each skeleton, a skeleton allowable angle is A, and a skeleton length is L, (Equation 5) is obtained.

Skeleton error absorption capacity (C)=Skeleton allowable angle (A)*Skeleton length (L) (Equation 5)

An assignment amount of error absorption is determined in proportion with the skeleton error absorption capacity (C). Herein, an error absorption ratio (Q) represented by (Equation 6) is calculated with respect to each skeleton.

Error absorption ratio (Q)=Skeleton error absorption capacity (C)/Total of error absorption capacity of all the skeletons having a linked relationship ($\Sigma$(C)) (Equation 6)

Error absorption ratios $Q_1, Q_2, \ldots, Q_N$ are calculated with respect to skeletons $1, 2, \ldots, N$ having a linked relationship in accordance with (Equation 6). Regarding an inter-frame error (D) with respect to the fixed position, the skeletons 1 to N respectively absorb error amounts of $D*Q_1$, $D*Q_2, \ldots, D*Q_N$. A concept of the skeleton error absorption capacity has been described above.

Figure 5:
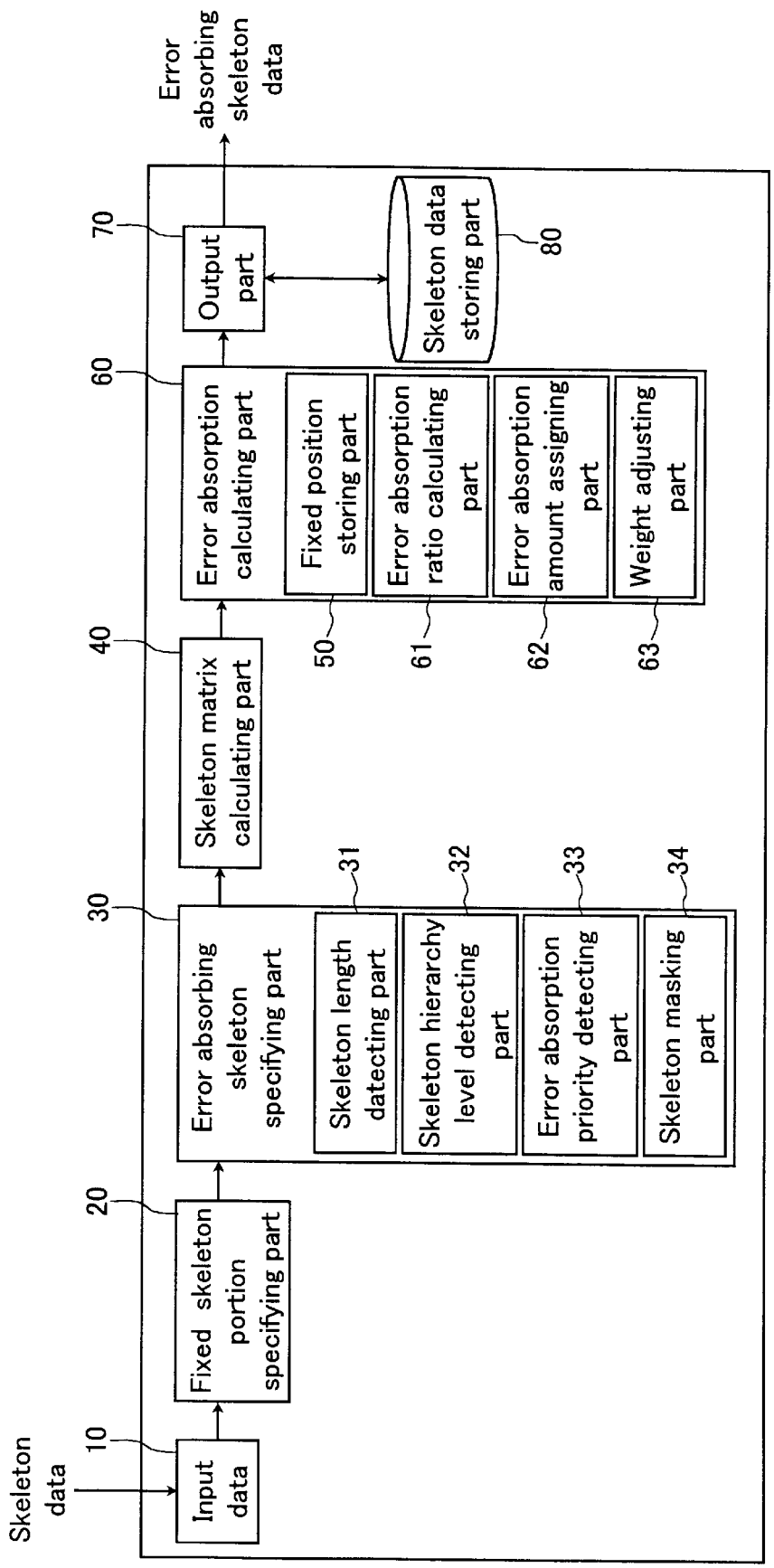
FIG. 5 is a schematic block diagram of a three-dimensional skeleton data error absorbing apparatus of Embodiment 2 according to the present invention.
Figure 6:
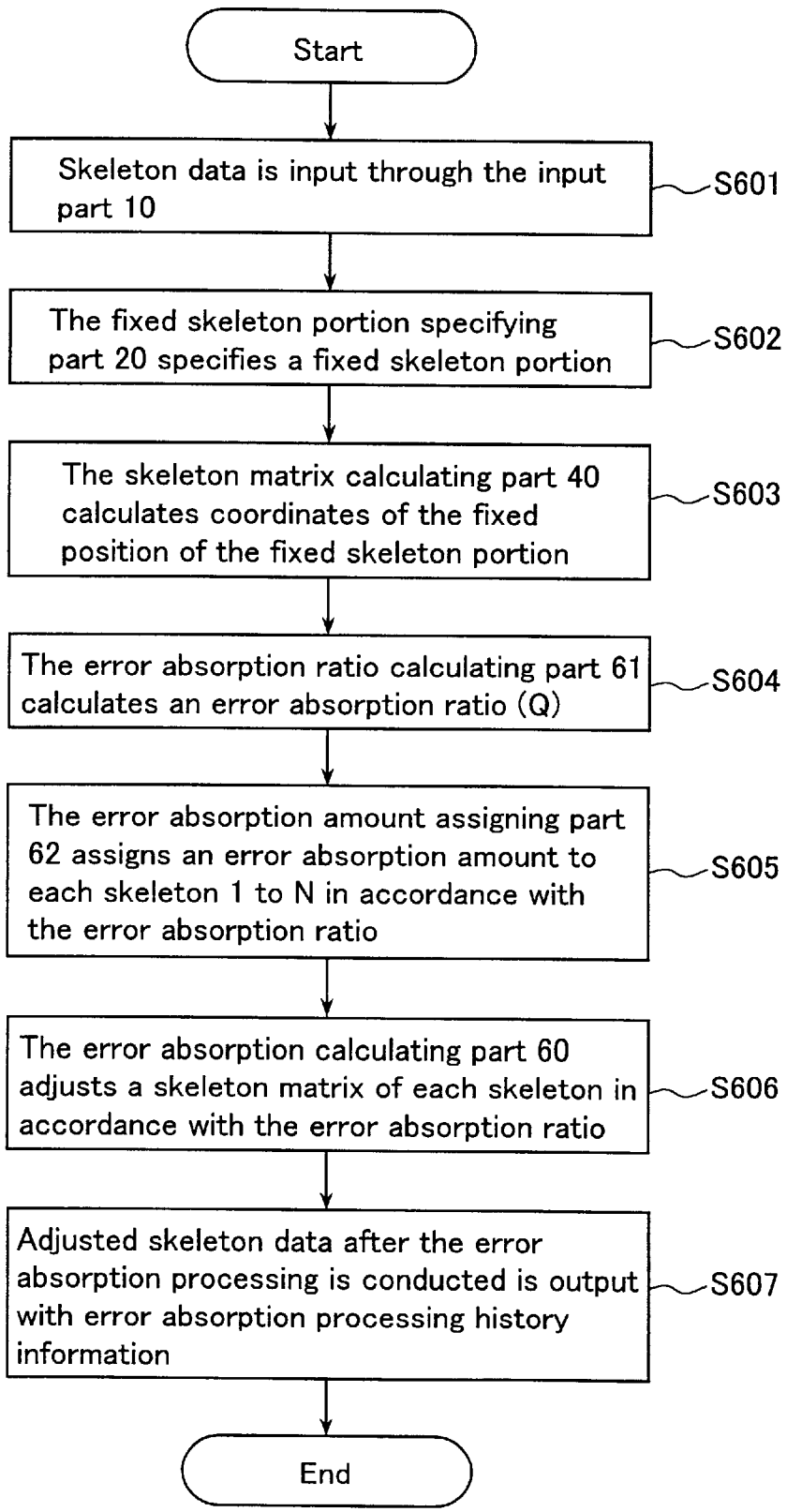
FIG. 6 is a flow chart showing an entire processing flow of the three-dimensional skeleton data error absorbing apparatus of Embodiment 2 according to the present invention.

FIG. 5 is a schematic block diagram of the apparatus. FIG. 6 shows an entire processing flow of the apparatus as processing operations.

As shown in FIG. 5, in the same way as in FIG. 1, the three-dimensional skeleton data error absorbing apparatus of Embodiment 2 mainly includes an input part 10, an input part 10, a fixed skeleton portion specifying part 20, an error absorbing skeleton specifying part 30, a skeleton matrix calculating part 40, a fixed position storing part 50, an error absorption calculating part 60, an output part 70, and a skeleton data storing part 80. In Embodiment 2, skeleton data input through the input part 10 contains allowable angle data for absorbing a skeleton error. Furthermore, the error absorption calculating part 60 includes: an error absorption ratio calculating part 61 for calculating an error absorption capacity from a product of an allowable angle and a length of each skeleton, and calculating an error absorption ratio of the error absorption capacity of each skeleton to the total error absorption capacity of all the skeletons having the above-mentioned linked relationship; an error absorption amount assigning part 62 for assigning an absorption amount of an error with respect to the fixed position in a subsequent frame to each skeleton in accordance with the error absorption ratio; and a weight adjusting part 63 with respect to an error absorption ratio. The error absorption calculating part 60 executes inverse matrix calculation for absorbing the assigned error amount for each skeleton. Although not shown, it is assumed that a memory, a device, and the like required for control processing of the entire system are provided. The components denoted with the same reference numerals as those in FIG. 1 described in Embodiment 1 have the same functions as those therein. Therefore, the description thereof will be omitted here for convenience.

The error absorption ratio calculating part 61 calculates an error absorption ratio (Q) of each skeleton by (Equation 5) to (Equation 6) of the above-described calculation of an error absorption ratio, and in the case where a weight is set, the weight adjusting part 63 calculates an weighted error absorption ratio (Q') multiplied by a weight amount.

The error absorption amount assigning part 62 assigns error absorption to each skeleton 1 to N regarding an inter-frame error (D) with respect to a fixed position. In accordance with the error absorption ratio of each skeleton 1 to N, error amounts of $D*Q_1, D*Q_2, \ldots, D*Q_N$ are assigned.

Next, processing steps of the three-dimensional skeleton data error absorbing apparatus of Embodiment 2 will be described with reference to FIG. 6.

First, skeleton data is input through the input part 10 (Operation 601). Herein, the input skeleton data contains an allowable angle data for absorbing a skeleton error.

Next, in the same way in Operation 302 shown in FIG. 3 in Embodiment 1, the fixed skeleton portion specifying part 20 specifies a fixed skeleton portion whose display position is desired to be fixed (Operation 602).

Next, in the same way as in Operation 303 shown in FIG. 3 in Embodiment 1, the skeleton matrix calculating part 40 calculates a coordinate of a fixed position of a fixed skeleton portion (Operation 603). The coordinate of the calculated fixed position is stored in the fixed position storing part 50.

Next, the error absorption ratio calculating part 61 calculates an error absorption ratio (Q) of each skeleton linked to the fixed skeleton portion, and in the case where a weight is set, the weight adjusting part 63 calculates a weight error absorption ratio (Q') multiplied by a weight amount (Operation 604).

Next, the error absorption amount assigning part 62 assigns an error absorption amount to each skeleton 1 to N in accordance with an error absorption ratio thereof, regarding an inter-frame error (D) with respect to the fixed position (Operation 605).

Next, the error absorption calculating part 60 adjusts a skeleton matrix of each skeleton in accordance with an error absorption ratio (Operation 606).

Next, skeleton data that is adjusted by the error absorption processing is output with the error absorption processing history information, and stored in the skeleton data storing part 80 (Operation 607).

As described above, in the three-dimensional skeleton data error absorbing apparatus of Embodiment 1, because of the skeleton calculation error absorption processing in accordance with Operations 601 to 607, an error occurring in skeleton matrix calculation is assigned to each skeleton in accordance with an error absorption ratio thereof to adjust a skeleton determinant and fix an object portion to be fixed at a fixed position on a display screen, whereby natural movement of a three-dimensional character can be ensured.

In the above description, although the error absorbing skeleton specifying part 30 is not used, it may be possible that a skeleton error absorption ratio is calculated based on one or more skeletons specified by the error absorbing skeleton specifying part 30 to assign an error absorption amount.

Embodiment 3

An outline of an entire configuration of a three-dimensional skeleton data error absorbing apparatus of Embodiment 1 according to the present invention and an entire processing flow of the apparatus will be described with reference to the drawings. The three-dimensional skeleton data error absorbing apparatus of Embodiment 3 absorbs an inter-platform error. A concept of an inter-platform error will be described. An inter-platform error is a calculation rounded-off error based on the difference in calculation precision between a calculating part of a platform used in the matrix calculation of the fixed position at skeleton data creating/editing and a calculating part of a platform of an apparatus that actually renders a three-dimensional object, such as game equipment of a user. In this case, in the same way as in the first inter-frame error, the end portion 110 to be displayed as in FIG. 1(*a*) is displayed at a shifted position as shown in FIG. 1(*b*), due to a calculation rounded-off error based on the difference in calculation precision in game equipment of a user or the like.

A principle of absorption of an inter-platform error will be described. It is preferable to produce animation by modeling it with high precision, using an excellent platform. Herein, it is assumed that the results of a rendering based on skeleton data obtained as original data are as shown in FIG. 1(*a*). Next, during error absorption editing, simulation is performed by using a resource environment of a platform assumed in home game equipment or the like and in particular, adjusting calculation precision to that of the assumed platform. It is assumed that skeleton calculation processing results and rendering results by simulation are as shown in FIG. 1(*b*). A shift in a rendered position between FIG. 1(*a*) and FIG. 1(*b*) is an inter-platform error. Next, skeleton calculation error absorption processing is conducted as rendered in FIG. 1(*c*) with calculation precision of the assumed platform. More specifically, the fixed skeleton portion 110 is specified, and skeleton error absorption processing is conducted by applying the method shown in Embodiment 1 or 2.

The principle of an inter-platform error absorption has been described above.

Figure 7:
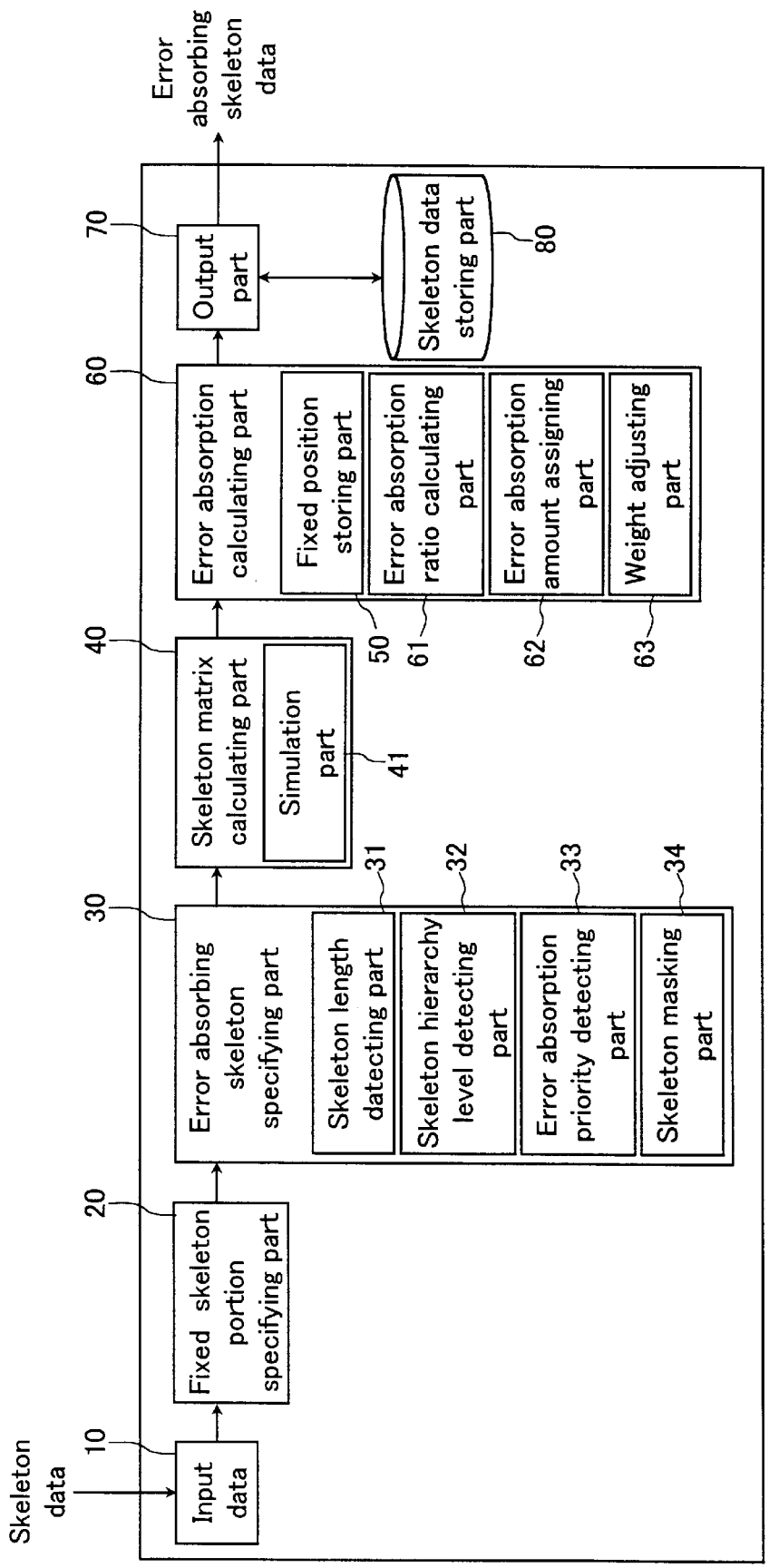
FIG. 7 is a schematic block diagram of a three-dimensional skeleton data error absorbing apparatus of Embodiment 3 according to the present invention.
Figure 8:
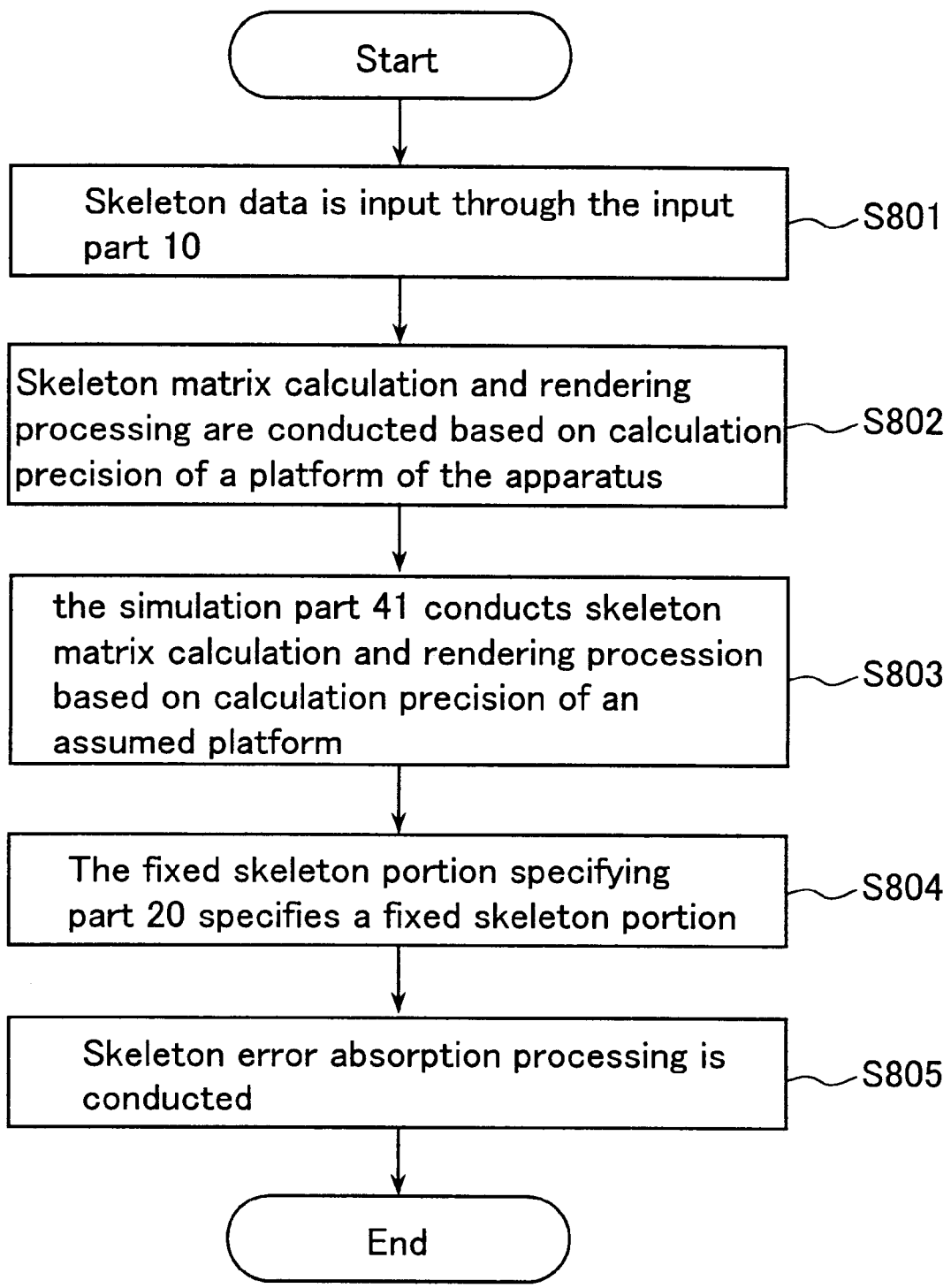
FIG. 8 is a flow chart showing an entire processing flow of the three-dimensional skeleton data error absorbing apparatus of Embodiment 3 according to the present invention.

FIG. 7 is a schematic block diagram of the apparatus. FIG. 8 shows an outline of an entire processing flow of the apparatus as processing operations.

As shown in FIG. 7, a three-dimensional skeleton data error absorbing apparatus of Embodiment 3 mainly includes an input part 10, a fixed skeleton portion specifying part 20, an error absorbing skeleton specifying part 30, a skeleton matrix calculating part 40, a fixed position storing part 50, an error absorption calculating part 60, an output part 70, and a skeleton data storing part 80 in the same way as in FIG. 1. In Embodiment 3, the skeleton matrix calculating part 40 further includes a simulation part 41.

Although not shown, it is assumed that a memory, a device, and the like required for control processing of the entire system are provided.

The simulation part 41 conducts skeleton matrix calculation and rendering processing, based on a resource environment of the assumed platform described in the concept of the above-mentioned inter-platform error absorption processing. For example, assuming that calculation precision of a platform used by an animator is the double-precision operation "DOUBLE", and resource environment of the assumed platform is the floating-point operation of single-precision "FLOAT", the simulation part 41 simulates skeleton calculation processing with the floating-point operation single-precision "FLOAT".

Next, processing operations of the three-dimensional skeleton data error absorbing apparatus of Embodiment 2 will be described with reference to FIG. 8.

First, skeleton data is input through the input part 10 (Operation 801).

Next, the skeleton matrix calculating part 40 conducts skeleton matrix calculation and rendering processing, based on the calculation precision of a platform resource environment of the apparatus (Operation 802).

Next, the simulation part 41 conducts skeleton matrix calculation and rendering processing, based on the calculation precision of resource environment of an assumed platform such as game equipment that is assumed to be used by a user (Operation 803). Herein, the rendering results in Operation 802 and the rendering results in Operation 803 are overlapped with each other so that the difference therebetween will be understood easily and they will be distinguished from each other. For example, they are displayed with difference colors, one of them is rendered with a dotted line, or one of them is rendered with a contour.

Next, the fixed skeleton portion specifying part 20 specifies, as a fixed skeleton portion, a portion at which an inter-platform error is desired to be corrected (Operation 804).

Hereinafter, skeleton error absorption processing is conducted (Operation 805). In the skeleton error absorption processing operation 805, the same processing operations as those in Operations 303 to 306 in FIG. 3 in Embodiment 1 or Operations 603 to 607 in FIG. 6 in Embodiment 2 are conducted. It is preferable that these processing operations are conducted based on calculation precision of a resource environment of the assumed platform so that the error absorption processing will be correctly reflected on the assumed platform.

As described above, in the three-dimensional skeleton data error absorbing apparatus of Embodiment 3, due to the skeleton calculation error absorption processing in accordance with Operations 801 to 805, an inter-platform error based on the difference in a resource environment and calculation precision between a platform during production of animation and a platform during use by a user can be previously calculated by simulation, and error absorption processing for absorbing an error is conducted with respect to skeleton data, and an object portion to be fixed is fixed on a display screen, whereby natural movement of a three-dimensional character can be ensured.

Embodiment 4

Figure 9:
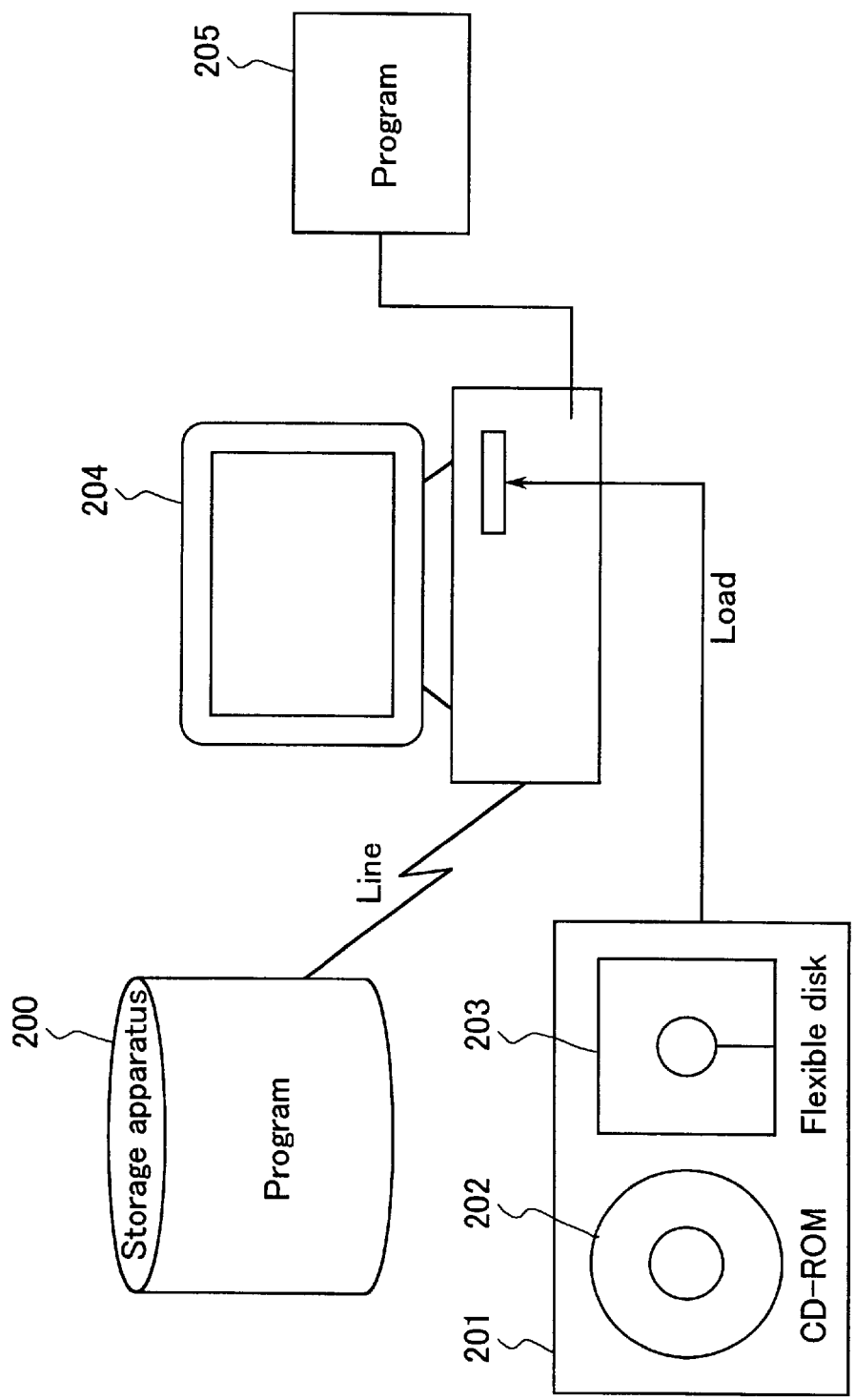
FIG. 9 shows examples of recording media storing a program of three-dimensional skeleton data compression processing operations of Embodiment 4 according to the present invention.

The three-dimensional skeleton data error absorbing apparatus of the present invention can be configured using various computers, by providing a computer-readable recording medium storing a program describing processing operations for realizing the above-mentioned configuration. Examples of the recording medium storing a program including processing operations for realizing the three-dimensional skeleton data error absorbing apparatus of the present invention include a recording medium 200 in a recording apparatus on a network and a recording medium 205 such as a hard disk and a RAM of a computer, as well as a portable recording medium 201 such as a CD-ROM 202 and a flexible disk 203, as shown in FIG. 9. In execution, the program is loaded onto a computer 204 and executed on a main memory.

It should be understood that various modifications and alterations can be made to the three-dimensional skeleton data error absorbing method and apparatus of the present invention without departing from the spirit of the invention. Thus, it should be noted that the present invention is not limited to the above-mentioned embodiments.

INDUSTRIAL APPLICABILITY

In the three-dimensional skeleton data error absorbing apparatus of the present invention, an inter-frame error occurring in skeleton matrix calculation is absorbed by adjusting a determinant of an error absorbing skeleton, and an object portion to be fixed is fixed at a fixed position on a display position, whereby natural movement of a three-dimensional character can be ensured.

In the three-dimensional skeleton data error absorbing apparatus of the present invention, regarding an error occurring in skeleton matrix calculation, an absorption amount is assigned to each skeleton linked to an object portion to be fixed in accordance with an error absorption ratio to adjust a skeleton determinant and fix an object portion to be fixed at a fixed position, whereby natural movement of a three-dimensional character can be ensured.

An inter-platform error based on the difference in a resource environment and calculation precision between a platform during production of animation and a platform during use by a user can be previously calculated by simulation, error absorption processing for absorbing an error is conducted with respect to skeleton data, and an object portion to be fixed is fixed at a fixed position on a display screen, whereby natural movement of a three-dimensional character can be ensured.

What is claimed is:

1. A three-dimensional skeleton data error absorbing apparatus for absorbing an error based on skeleton calculation in an apparatus for editing skeleton data and polygon data describing a three-dimensional character, comprising:

an input part for inputting skeleton data;

a fixed skeleton portion specifying part for specifying a skeleton portion whose display position is desired to be fixed;

an error absorbing skeleton specifying part for determining an error absorbing skeleton that absorbs an error based on skeleton calculation among a skeleton group having a linked relationship up to the fixed skeleton portion;

a skeleton matrix calculating part for conducting matrix calculation in accordance with a linked relationship of the skeleton;

a fixed position storing part for storing a fixed position that is to be a matrix calculation result of the fixed skeleton portion; and an error absorption calculating part for adjusting a skeleton matrix of the error absorbing skeleton in such a manner that, in skeleton matrix calculation for calculating a position of the fixed skeleton portion in a frame to be subjected to error absorption, a matrix calculation result matches the fixed position.

2. A three-dimensional skeleton data error absorbing apparatus according to claim 1, wherein assuming that M1 represents a matrix calculation result obtained by calculating the fixed position, in skeleton matrix calculation for calculating the fixed position in a subsequent frame, $M2_{parent}$ represents a matrix calculation result of a skeleton at a level higher than that of the error absorbing skeleton among skeletons other than the error absorbing skeleton, $M2_{child}$ represents a matrix calculation result of a skeleton at a level lower than that of the error absorbing skeleton, and M3 represents a skeleton matrix of the error absorbing skeleton, the error absorption calculating part obtains the error absorbing skeleton matrix M3 by using an equation $M3=M2_{parent}^{-1} \times M1 \times M2_{child}^{-1}$.

3. A three-dimensional skeleton data error absorbing apparatus according to claim 2, wherein the skeleton data contains allowable angle data for absorbing a skeleton error, the error absorption calculating part includes an error absorption ratio calculating part for calculating an error absorption capacity from a product of an allowable angle and a length of each skeleton and calculating an error absorption ratio from the error absorption capacity of each skeleton, with respect to a total error absorption capacity of all the skeletons having a linked relationship, and an error absorption amount assigning part for assigning an absorption amount of an error with respect to the fixed position in a subsequent frame to each skeleton in accordance with the error absorption ratio, and executes inverse matrix calculation for absorbing the assigned error amount on a skeleton basis.

4. A three-dimensional skeleton data error absorbing apparatus according to claim 3, wherein the error absorption ratio calculating part is capable of adjusting weighting with respect to an error absorption ratio on a skeleton basis.

5. A three-dimensional skeleton data error absorbing apparatus according to claim 2, wherein, in an editing operation for absorbing an error based on skeleton calculation, matrix calculation of the fixed position calculation is executed based on calculation precision in a calculating part of a platform used in skeleton data creating/editing, thereby specifying a fixed position, and error absorption calculation by the error absorption calculating part is executed based on calculation precision in a calculating part of a platform of an apparatus for rendering a three-dimensional object, thereby absorbing a calculation rounded-off error based on calculation precision of the platform.

6. A three-dimensional skeleton data error absorbing apparatus according to claim 1, wherein the error absorbing skeleton specifying part includes a skeleton length detecting part, and selects a longest skeleton among the skeleton group having a linked relationship as the error absorbing skeleton.

7. A three-dimensional skeleton data error absorbing apparatus according to claim 1, wherein the error absorbing skeleton specifying part includes a skeleton hierarchy level detecting part, and selects a skeleton at a highest hierarchy level among the skeleton group having a linked relationship as the error absorbing skeleton.

8. A three-dimensional skeleton data error absorbing apparatus according to claim 1, wherein the skeleton data includes a priority at which a skeleton is selected as a target for the error absorbing skeleton, and the error absorbing skeleton specifying part selects the error absorbing skeleton from the skeleton group having a linked relationship in accordance with the priority.

9. A three-dimensional skeleton data error absorbing apparatus according to claim 8, wherein the priority is set in inverse proportion with a degree of an eye-catching property as an object portion of a skeleton.

10. A three-dimensional skeleton data error absorbing apparatus according to claim 1, wherein the error absorbing skeleton specifying part includes a skeleton masking part for specifying a skeleton that is not to be selected as the error absorbing skeleton, and the skeleton specified by the skeleton masking part is not selected as the error absorbing skeleton.

11. A three-dimensional skeleton data error absorbing apparatus according to claim 1, wherein the skeleton data contains allowable angle data for absorbing a skeleton error, the error absorption calculating part includes an error absorption ratio calculating part for calculating an error absorption capacity from a product of an allowable angle and a length of each skeleton and calculating an error absorption ratio from the error absorption capacity of each skeleton, with respect to a total error absorption capacity of all the skeletons having a linked relationship, and an error absorption amount assigning part for assigning an absorption amount of an error with respect to the fixed position in a subsequent frame to each skeleton in accordance with the error absorption ratio, and executes inverse matrix calculation for absorbing the assigned error amount on a skeleton basis.

12. A three-dimensional skeleton data error absorbing apparatus according to claim 11, wherein the error absorption ratio calculating part is capable of adjusting weighting with respect to an error absorption ratio on a skeleton basis.

13. A three-dimensional skeleton data error absorbing apparatus according to claim 1, wherein the fixed skeleton portion specifying part is capable of specifying a plurality of fixed skeleton portions among the skeleton group having a linked relationship, and the error absorbing skeleton specifying part selects a plurality of error absorbing skeletons.

14. A three-dimensional skeleton data error absorbing apparatus according to claim 1, wherein, in an editing operation for absorbing an error based on skeleton calculation, matrix calculation of the fixed position calculation is executed based on calculation precision in a calculating part of a platform used in skeleton data creating/editing, thereby specifying a fixed position, and error absorption calculation by the error absorption calculating part is executed based on calculation precision in a calculating part of a platform of an apparatus for rendering a three-dimensional object, thereby absorbing a calculation rounded-off error based on calculation precision of the platform.

15. A computer-readable recording medium storing a program including processing operations for absorbing an error based on skeleton calculation in editing of skeleton data and polygon data describing a three-dimensional character, the program comprising:

an input processing operation of inputting skeleton data;

a fixed skeleton portion specifying processing operation of specifying a skeleton portion whose display position is desired to be fixed;

an error absorbing skeleton specifying processing operation of determining an error absorbing skeleton that absorbs an error based on skeleton calculation among a skeleton group having a linked relationship up to the fixed skeleton portion;

a skeleton matrix calculating processing operation of conducting matrix calculation in accordance with a linked relationship of the skeleton;

a fixed position storing processing operation of storing a fixed position that is to be a matrix calculation result of the fixed skeleton portion; and an error absorption calculating processing step of adjusting a skeleton matrix of the error absorbing skeleton in such a manner that, in skeleton matrix calculation for calculating a position of the fixed skeleton portion in a frame to be subjected to error absorption, a matrix calculation result matches the fixed position.

16. A computer-readable recording medium according to claim 15, wherein the skeleton data contains allowable angle data for absorbing a skeleton error, the error absorption calculating processing operation includes: an error absorption ratio calculating processing operation of calculating an error absorption capacity from a product of an allowable angle and a length of each skeleton and calculating an error absorption ratio from the error absorption capacity of each skeleton, with respect to a total error absorption capacity of all the skeletons having a linked relationship; an error absorption amount assigning processing operation of assigning an absorption amount of an error with respect to the fixed position in a subsequent frame to each skeleton in accordance with the error absorption ratio; and a processing operation of executing inverse matrix calculation for absorbing the assigned error amount on a skeleton basis.

17. A computer-readable recording medium according to claim 15, wherein, in an editing operation for absorbing an error based on skeleton calculation, the skeleton matrix calculating processing operation includes a processing operation of executing matrix calculation of the fixed position calculation based on calculation precision in a calculating part of a platform used in skeleton data creating/editing, thereby specifying a fixed position, and the error absorption calculating processing operation includes a processing operation of executing error absorption calculation based on calculation precision in a calculating part of a platform of an apparatus for rendering a three-dimensional object, thereby absorbing a calculation rounded-off error based on calculation precision of the platform.

\* \* \* \* \*